United States Patent Office 2,875,181
Patented Feb. 24, 1959

2,875,181

PRODUCTION OF POLYESTERS BY POLY-ADDITION

Gerhard Faerber, Moers, Germany, assignor to Deutsche Solvay-Werke G. m. b. H., Solingen-Ohligs, Germany No Drawing. Application April 4, 1955
Serial No. 499,200

Claims priority, application Germany July 26, 1954

7 Claims. (Cl. 260—78.4)

This invention relates to the production of polyesters by poly-addition.

It has been found that linear polyesters of a new kind are formed by poly-addition of divinyl ethers on dicarboxylic acids. The polyesters which result from the poly-addition contain the following recurring molecular grouping:

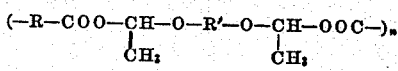

in which R and R' can be any residues from divinyl ethers and dicarboxylic acids and $n$ is an integer. As against poly-condensation which, as is known, likewise leads to polyesters, poly-addition has the advantage that it takes place without splitting off of molecules, and proceeds without additional catalysts, since the dicarboxylic acids themselves act catalytically; in addition, the reaction temperature can be kept lower and the time of reaction is considerably shortened.

The production of polyesters by poly-addition takes place by heating together divinyl ethers and dicarboxylic acids; it can be carried out in the presence of a solvent and takes place suitably while passing a current of inert gas over the reaction mixture. Examples of divinyl ethers which are suitable for the process of the invention are: ethyleneglycol-, diethyleneglycol-, propyleneglycol-, butanediol-, hexanediol-, and decanediol-divinyl-ethers. Examples of dicarboxylic acids are: succinic acid, glutaric acid, adipic acid, sebacic acid, and the isomeric phthalic acids. Solvents which can be used are those which do not contain basic groups or hydroxy groups, such as ketones, cyclic ethers, benzine and benzenehydrocarbons.

The polyesters produced by this process are solid to viscous high-molecular weight compounds at normal temperature. They are used as plasticisers, greases or lubricants.

EXAMPLES

When not otherwise indicated, the parts specified below are parts by weight.

Example 1

41.5 parts of powdered o-phthalic acid and 39.5 parts of freshly distilled diethyleneglycol-divinylether are stirred under nitrogen in a reaction vessel, which carries in three sockets a reflux condenser, a gas inlet tube and a stirrer, and are heated in such a way that after 45 minutes, they have reached about 150° C. The clear solution is maintained while stirring for a further 10 minutes at this temperature. After cooling, a solid, transparent and almost colourless thermoplastic resin has been formed.

The acid number of the resin is under 30.

Example 2

96 parts of ethyleneglycol-divinylether are heated under nitrogen to boiling (124° C.) in the apparatus indicated in Example 1, and 110 parts of adipic acid are added in portions while stirring. After heating for two hours the acid number of the polyester produced is 18 and the saponification number 740. The oxime number shows 93% of aldehyde groups. The number of double bonds originally present has fallen to 6%. The viscosity is 63,000 centipoises at 20° C.

This polyester is a viscous, sticky and almost colourless substance.

Example 3

39.5 parts of diethyleneglycol-divinylether together with 50.5 parts of sebacic acid are stirred in the apparatus described in Example 1, and heated under nitrogen in such a way that after 45 minutes they have reached 150° C. The now clear solution is maintained at this temperature for a further 2 hours. The polyester formed is a viscous coloured compound with a viscosity of 45,000 centipoises at 20° C.

Example 4

If, in Example 3, instead of the sebacic acid, 29.5 parts of succinic acid are introduced, an almost colourless polyester with a viscosity of 54,000 centipoises at 20° C. is obtained.

Example 5

79 parts of diethyleneglycol-divinylether and 41.5 parts of terephthalic acid are heated in a 250-ml. round-bottomed flask, which is fitted with a stiring arrangement, thermometer, gas inlet tube and reflux condenser, during which nitrogen is passed through the flask. At 150° C. the whitish pulpy mass is transformed into a light yellow resin. The source of heat is removed and the contents of the flask are stirred for a further 30 minutes.

Excess diethyleneglycol-divinylether is removed by distillation in vacuum. A yellowish thermoplastic resin remains, which has similar properties to the product obtained in Example 1.

What I claim is:

1. Method of preparing polyesters, comprising heating a liquid divinyl ether of the formula

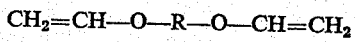

wherein R is a bivalent radical containing from 2 to 4 carbon atoms and being selected from the group consisting of alkylene radicals and dialkylene ether radicals, and an acid having free carboxyl groups and no double bonds susceptible of polymerization, the acid being selected from the group consisting of saturated aliphatic dicarboxylic acids having 4 to 10 carbon atoms, and phenylene dicarboxylic acids, the heating taking place at the boiling point of the divinyl ether used.

2. In the method according to claim 1, using a liquid divinyl ether of said formula wherein R is a bivalent radical containing from 2 to 4 carbon atoms and being selected from the group consisting of alkylene radicals and dialkylene ether radicals, the chain of carbon atoms being interrupted by oxygen.

3. Method of preparing polyesters, comprising heating a liquid divinyl ether of the formula

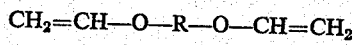

wherein R is a bivalent radical containing 2 to 4 carbon atoms and being selected from the group consisting of alkylene radicals and dialkylene ether radicals, and an acid having free carboxyl groups and no double bonds susceptible of polymerization, the acid being selected from the group consisting of saturated aliphatic dicarboxylic acids having 4 to 10 carbon atoms, and phenylene dicarboxylic acids, the heating taking place at approximately 150°.

4. In the method according to claim 3, using a liquid divinyl ether of said formula wherein R is a bivalent radical containing from 2 to 4 carbon atoms and being selected from the groups consisting of alkylene radicals and dialkylene ether radicals, the chain of carbon atoms being interrupted by oxygen.

5. In the method according to claim 1, carrying out the reaction in a current of an inert gas.

6. In the method according to claim 3, carrying out the reaction in a current of an inert gas.

7. A linear polyester which is composed of the following recurrent unit

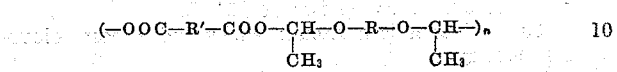

wherein R' is a bivalent radical of an acid selected from the group consisting of saturated aliphatic dicarboxylic acids having 4 to 10 carbon atoms, and phenylene dicarboxylic acids, R is a bivalent radical containing from 2 to 4 carbon atoms and being selected from the group consisting of alkylene radicals and dialkylene radicals, and $n$ being an integer sufficiently large that the polymer is a solid to viscous high molecular weight compound at normal temperature.

References Cited in the file of this patent

UNITED STATES PATENTS

| 2,340,110 | D'Alelio | Jan. 25, 1944 |
| 2,682,532 | Adelman | June 29, 1954 |
| 2,744,095 | Caldwell | May 1, 1956 |

FOREIGN PATENTS

| 745,424 | Germany | Mar. 31, 1944 |

OTHER REFERENCES

Schulz et al.: Angen, Chem. 62, No. 5, 105–132 (1950).